United States Patent
McGlamery, Jr. et al.

(10) Patent No.: US 8,207,387 B2
(45) Date of Patent: Jun. 26, 2012

(54) INTEGRATED DIMETHYL ETHER RECOVERY FROM AN OXYGENATE-TO-OLEFINS PROCESS AND PRODUCTION OF POLYPROPYLENE

(75) Inventors: Gerald G. McGlamery, Jr., Houston, TX (US); Lawrence C. Smith, Houston, TX (US); Jennifer L. Bancroft, Houston, TX (US)

(73) Assignee: Exxonmobil Chemical Patents Inc., Houston, TX (US)

(*) Notice: Subject to any disclaimer, the term of this patent is extended or adjusted under 35 U.S.C. 154(b) by 282 days.

(21) Appl. No.: 12/772,276

(22) Filed: May 3, 2010

(65) Prior Publication Data
US 2010/0317908 A1 Dec. 16, 2010

Related U.S. Application Data

(60) Provisional application No. 61/187,347, filed on Jun. 16, 2009.

(51) Int. Cl.
C07C 2/06 (2006.01)
C07C 1/207 (2006.01)
(52) U.S. Cl. ......... 585/327; 585/326; 585/502; 585/639
(58) Field of Classification Search .............. 585/327, 585/326, 502, 639
See application file for complete search history.

(56) References Cited

U.S. PATENT DOCUMENTS

| | | | |
|---|---|---|---|
| 4,052,479 | A | 10/1977 | Chang et al. |
| 4,387,263 | A | 6/1983 | Vogt et al. |
| 4,587,373 | A | 5/1986 | Hsia |
| 5,609,734 | A | 3/1997 | Streicher et al. |
| 6,855,858 | B2 | 2/2005 | Cheng et al. |
| 2003/0004386 | A1 | 1/2003 | Lattner et al. |
| 2004/0064009 | A1 | 4/2004 | Borgmann et al. |
| 2005/0033103 | A1 | 2/2005 | Van Egmond et al. |
| 2005/0187358 | A1 | 8/2005 | Van Egmond et al. |
| 2008/0242908 | A1 | 10/2008 | McGlamery et al. |

FOREIGN PATENT DOCUMENTS

| | | |
|---|---|---|
| EP | 0 060 103 | 4/1985 |
| EP | 0 096 996 | 6/1988 |
| WO | 03/033441 | 4/2003 |
| WO | 2006/061227 | 6/2006 |

*Primary Examiner* — Thuan Dinh Dang
(74) *Attorney, Agent, or Firm* — Kevin M. Faulkner

(57) ABSTRACT

Provided is a method of producing polypropylene comprising contacting an oxygenate stream with a molecular sieve to form an olefin stream comprising propane, propylene and dimethylether; introducing the olefin stream into a propylene rectification tower possessing from less than 200 theoretical stages; withdrawing from the propylene rectification tower a bottom stream comprising dimethylether, a sidestream comprising propane, and an overhead stream comprising propane and propylene; introducing the overhead to a condenser to accumulate a propylene-rich stream; passing the propylene-rich stream to a splitter to produce (i) a first propylene stream that is introduced into a polypropylene reactor to contact a polyolefin catalyst, and (ii) a second propylene stream that is re-introduced into the rectification tower, the first and second propylene streams introduced at a desirable ratio; and recirculating the dimethylether stream to contact the molecular sieve.

15 Claims, 1 Drawing Sheet

INTEGRATED DIMETHYL ETHER RECOVERY FROM AN OXYGENATE-TO-OLEFINS PROCESS AND PRODUCTION OF POLYPROPYLENE

CROSS REFERENCE TO RELATED APPLICATIONS

This application claims priority to U.S. Provisional Patent Application No. 61/187,347, filed Jun. 16, 2009, the disclosure of which is incorporated herein by reference in its entirety.

FIELD OF THE INVENTION

The disclosure relates to methods of producing polyolefins such as polypropylene from an olefin feed derived from an oxygenate-to-olefins process that is catalyzed by a molecular sieve catalyst.

BACKGROUND

Methanol-to-olefins ("MTO") processes, and more broadly, oxygenate-to-olefins ("OTO") processes that use molecular sieve produce dimethyl ether ("DME") as a byproduct. DME can be converted, in presence of certain molecular sieves, to olefins and is therefore recovered for recycle to the MTO reactor for such conversion. Several methods of isolating the DME from such olefins streams and delivering propylene useful in polymerization processes are known, such as in US 2005-0187358, US 2006-0111601, US 2008-0242908, WO 2006-061227 and WO 2003-033441.

In a fully optimized production train for producing polypropylene from oxygenates via an OTO (or MTO) reactor, it is advantageous to maximize the yield of propylene product while minimizing investment and operating costs. This must be accomplished without introducing DME to the polymerization reactor, and unfortunately increasing the yield of propylene product typically increases the amount of DME as a side product. Consequently, a simple combination of elements known in the art is not sufficient to produced propylene suitable for polymerization at a reasonable cost. What is needed is a method of further reducing investment costs in producing useful propylene, while maintaining the desired low level of oxygenates such as DME in the propylene.

SUMMARY

Provided in one aspect is a method of producing polypropylene comprising contacting an oxygenate stream with a molecular sieve to form an olefin stream comprising propane, propylene and DME; introducing the olefin stream into a propylene rectification tower possessing, for example, from less than 200 theoretical stages; withdrawing (i) from the propylene rectification bottoms a DME stream, (ii) from a propylene rectification sidestream a propane stream, and (iii) from the propylene rectification overhead a gas stream comprising propane and propylene; introducing the gas stream to a condenser to accumulate a propylene-rich stream; passing the propylene-rich stream to a splitter to produce (i) a first propylene stream that is introduced into a polypropylene reactor to contact a polyolefin catalyst, and (ii) a second propylene stream that is re-introduced into the rectification overhead, the first and second propylene streams introduced at any desirable ratio described herein, such as, for example, within the range from 1:2 to 1:30; and recirculating the DME stream to contact the molecular sieve. Polypropylene is then isolated from the polypropylene reactor.

In certain embodiments the olefin stream and overhead stream also comprises ethylene and ethane; the method thus further comprising separating an ethane and ethylene-rich stream from the condenser.

In certain embodiments, the process further comprises introducing the olefin stream into a deethanizer to produce a second olefin stream which is then introduced into the propylene rectification tower.

The various descriptive elements and numerical ranges disclosed herein can be combined with other descriptive elements and numerical ranges to describe preferred embodiments of the apparatus and process described herein; further, any upper numerical limit of an element can be combined with any lower numerical limit of the same element to describe preferred embodiments. In this regard, the phrase "within the range from X to Y" is intended to include within that range the "X" and "Y" values.

DETAILED DESCRIPTION

Figure 1:
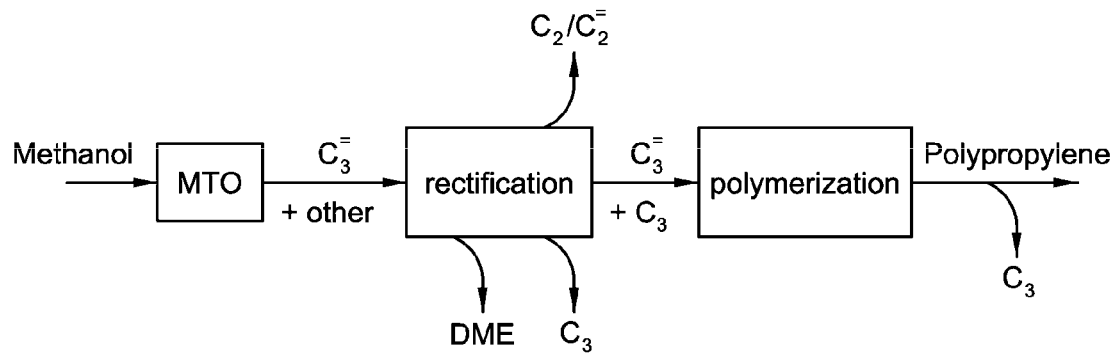
FIG. 1 is a flow diagram of a basic chemical process of converting oxygenates such as methanol and DME to olefins such as propylene, and then to production of polypropylene.

The inventors have found that an intermediate-grade of propylene can be produced from an OTO (or MTO) process, or similar process, that is refined enough to be used to make polypropylene. In isolating the desired propylene, the OTO effluent which contains propylene and propane can be rectified using milder and less costly treatment than what is typically practiced. Thus, for example, the rectification can be accomplished using distillation conditions suitable to isolate propylene containing an acceptable amount of propane, while removing residual components such as DME, using a relatively short tower. This process takes advantage of the separation of propane from propylene in a polymerization reactor, as well as other efficiencies. An embodiment of the relevant reaction flow from methanol to polypropylene is illustrated in FIG. 1.

In one embodiment, a rectification tower receives a stream of at least light olefins, paraffins, and DME. These components can be received at any desirable location along the rectification tower as is familiar with those skilled in the art, at the lower end of the tower in a particular embodiment. The light olefins can be mostly propylene, but more typically include ethylene. Light paraffins are typically ethane and propane, with a minor amount of methane. Hydrogen and/or carbon monoxide may also be present in the stream of olefins. In a particular embodiment, the olefin stream is sourced from the bottoms of a deethanizer, and in a more particular embodiment the olefin stream is sourced from the overhead of a depropanizer (preceded by a deethanizer). In yet a more particular embodiment, the olefin stream is sourced directly from the effluent stream of an OTO reactor.

Rectification of Propylene

The propylene rectification tower that is useful herein can be any one known in the art that can effectively separate DME from propylene. In certain embodiments, the rectification tower used to separate the propylene from other olefin stream components possesses from less than 200 or 190 or 185 or 180 or 175 or 170 or 165 theoretical stages, and possesses within the range of from 20 or 50 or 80 to 165 or 170 or 175 or 180 or 185 or 190 or 200 theoretical stages in other embodiments. The "theoretical stages," or $N_t$, is related to the actual number of stages, trays, packing or other contacting surfaces within the rectification tower based on the efficiency of such contacting surfaces by the following equation (1):

$$N_a = N_t/E \qquad (1)$$

wherein $N_a$ is the actual number of contacting surfaces and "E" is the contacting efficiency of each surface or the packing. This relationship is well known in the art and described by, for example, H. Z. Kister in DISTILLATION DESIGN (1st Ed., McGraw-Hill, 1992) and in PERRY'S CHEMICAL ENGINEER'S HANDBOOK (R. H. Perry and D. W. Green, eds., 6th Ed., McGraw-Hill, 1994).

A variety of designs are well known for the contacting surfaces used in industrial rectification (or "distillation") towers, including both trayed-tower designs and packed-tower designs. In a trayed tower, the desired contacting occurs as the vapor flows upward through openings in the trays and contacts the liquid flowing across the trays. In a packed tower, the vapor flows upward around packing elements and contacts the liquid flowing down on the surfaces of the packing elements. Regardless of the design, the number of theoretical equilibrium stages, $N_t$, can be estimated by techniques known to one skilled in the art. For example, modern computational algorithms can be used to solve the equilibrium stage equations simultaneously using matrix algebra and are well known.

In the rectification tower described herein, the $N_t$ required to achieve a given separation depends upon the amount of reflux used. Using more reflux decreases the number of stages required and using less reflux increases the number of stages required. Hence, the calculation of $N_t$ may be repeated at various reflux rates. The $N_t$ value is then divided by the tray efficiency, E, to determine the actual number of trays, packing or physical stages, $N_a$, needed in the separating tower. The final design choice of the number of trays or amount of packing to be installed in the rectification tower is then selected based upon an economic balance between the cost of additional trays and/or packing and the cost of using a higher reflux rate. In the present disclosure, the number of stages is chosen so that a sufficient amount of DME is removed from the olefin stream at the lowest possible cost.

In certain embodiments, the method of producing polypropylene comprises, or consists essentially of in a particular embodiment, the following steps:
(1) contacting an oxygenate stream with a molecular sieve to form an olefin stream comprising propane, propylene and dimethylether, and optionally ethane and ethylene;
(2) introducing the olefin stream into a propylene rectification tower possessing from less than 200 or 190 or 185 or 180 or 175 or 170 or 165 theoretical stages;
(3) withdrawing from the propylene rectification tower a bottom stream comprising dimethylether, a sidestream comprising propane, and an overhead stream comprising propane and propylene, and optionally ethane and ethylene;
(4) introducing the overhead to a condenser to separate (or "accumulate") (i) a propylene-rich stream and, optionally (ii) an ethane and ethylene-rich stream;
(5) passing the propylene-rich stream to a splitter to produce (i) a first propylene stream that is introduced into a polypropylene reactor to contact a polyolefin catalyst, and (ii) a second propylene stream that is re-introduced into the rectification tower, the first and second propylene streams introduced at a ratio within the range from 1:2 or 1:5 or 1:8 or 1:10 to 1:15 or 1:20 or 1:30; and
(6) recirculating the dimethylether stream to contact the molecular sieve.

In certain embodiments, the OTO process results in propylene and propane with only a minor amount, or no ethylene or ethane. Alternatively, the olefin stream is contacted with a deethanizer prior to the olefin stream entering the propylene rectification tower. This creates a second olefin stream that enters the tower. Thus, in certain embodiments, ethylene and ethane, together, are present to less than 1.0 or 0.5 or 0.1 wt %, by weight of the olefin feed when entering the tower. However, when present in whatever amount, the ethylene and ethane will enter the propylene rectification tower and be withdrawn as overhead in the tower to the condenser.

In a particular embodiment, the ethane and ethylene-rich stream from (4)(ii), when present, is refined further in at least one separation means such as one or more fractionation is columns. This ethylene-rich stream may also contain other light components such as hydrogen, etc. These separation means are often referred to in the art as "demethanizers" and/or "deethanizers." Any propane and/or propylene recovered can be sent back to the propylene rectification tower or the condenser. The deethanizer, as referred to herein, can be any device that is suitable for separating ethylene and/or ethane from propylene and/or propane. The demethanizer is also a device that can be used for separating light fractions from one another, examples of which are described in U.S. Pat. Nos. 4,464,190 and 5,361,589.

As used herein, the "splitter" is a means of portioning liquid and/or vapor streams into at least two separate streams in any desirable ratio, an example of which is a three-way valve allowing for controlled portions of material flow through two exits. The "olefin stream" could also contain propyne (methylacetylene) and/or propadiene ("MAPD"), depending on whether or not it has been hydrotreated through an MAPD converter. In a preferred embodiment, the olefin stream is not hydrotreated.

As used herein, the "propylene-rich stream" is a gas/liquid stream of hydrocarbon comprising at least 50 wt %, by weight of the stream, of propylene; and preferably comprises at least 60 or 70 or 80 or 90 or 95 wt % propylene in certain embodiments. Desirably, the propylene rectification tower is operated at conditions to provide a propylene-rich stream comprising from less than 200 or 150 or 100 or 50 wppm dimethylether.

Desirably, the propylene rectification tower is operated at conditions to provide a first propylene stream comprising from less than 200 or 150 or 100 or 50 wppm dimethylether. Further, in other embodiments the propylene rectification tower is operated at conditions to provide a first propylene stream comprising within the range from 1 or 1.5 or 3 to 5 or 8 or 10 wt % propane, by weight of the first propylene stream. Such conditions include operation at a pressure within the range from 50 or 100 or 200 or 220 to 250 or 300 or 500 or 1000 psig in the propylene rectification tower. In certain embodiments, other conditions include operation at an olefin stream temperature, maintained by cooling or heating the olefin stream prior to introduction into the propylene rectification tower, from greater than 30 or 40 or 50 or 60° C. in certain embodiments, or less than 50 or 40 or 30 or 20 or 0 or −10 or −10° C. in other embodiments; and within the range from −40 or −30 or −10 or 0 or 10 or 30 or 40 or 50 to 100 or 120 or 150 or 200° C. in yet other embodiments. Alternately, the olefin stream may be heated/cooled upon entering the tower. The tower itself at some point may also have a heat source to heat the contents of the tower and/or a portion of the is tower to the desirable temperature.

The olefin stream may be treated to remove residual water from the OTO reaction as is known in the art, such as by, for example, condensation, quenching and/or solid drying means. When used, such treatment would typically occur prior to contacting the olefin stream with the propylene rectification tower.

The propylene rectification sidestream can be taken from any desirable location, depending upon the design and $N_t$ of the rectification tower. In certain embodiments, the sidestream is taken from a location along the tower that is within the range from 1 or 5 to 20 or 30 or 40 theoretical stages from the bottom of the propylene rectification tower. Furthermore, the second propylene stream is re-introduced into the rectification tower at any desirable location, depending on the design of the tower. In certain embodiments, the second propylene stream is re-introduced into the tower at a position along the tower that is within the range from 5 or 10 or 20 or 30 or 50 or 60 to 80 or 90 or 100 theoretical stages from the bottom.

The OTO Process

As used herein an "MTO" process is a subset of the broader "OTO" process. In the OTO process, an oxygenate stream is converted to one or more olefins using any desirable acidic-type catalyst. In certain embodiments, the oxygenate stream is combined with a recycle oxygenate stream, such as a stream containing DME from the propylene rectification tower, to form a combined oxygenate stream, and the combined oxygenate stream is contacted with an olefin-forming catalyst in an appropriate reactor (an "OTO reactor") to form the olefin product. The oxygenate includes one or more organic compound(s) containing at least one oxygen atom. Preferably, the oxygenate includes one or more alcohol(s), preferably aliphatic alcohol(s) where the aliphatic moiety of the alcohol(s) has from 1 to 4 carbon atoms. Non-limiting examples of specific types of oxygenates include methanol, ethanol, n-propanol, isopropanol, DME, methyl ethyl ether, diethyl ether, di-isopropyl ether, formaldehyde, dimethyl carbonate, dimethyl ketone, acetic acid, and mixtures thereof.

In one embodiment, an olefin stream is obtained by contacting oxygenate with one or more molecular sieves. Molecular sieves capable of converting an oxygenate to an olefin compound include zeolites as well as non-zeolites, and are of the large-, medium-, or small-pore type. Small-pore molecular sieves are preferred in one embodiment, however. Zeolites include materials containing silica and optionally alumina and/or phosphorous, and materials in which the silica and alumina portions have been replaced in whole or in part with other oxides. For example, germanium oxide, tin oxide, and mixtures thereof can replace the silica portion. Boron oxide, iron oxide, gallium oxide, indium oxide, and mixtures thereof can replace or be added in addition to the alumina portion. Unless otherwise specified, the terms "zeolite" and "zeolite material" as used herein, shall mean not only materials containing silicon atoms and, optionally, aluminum atoms in the crystalline lattice structure thereof, but also materials which contain suitable replacement atoms for such silicon and aluminum atoms.

One type of olefin-forming catalyst capable of producing large quantities of ethylene and propylene is a silicoaluminophosphate ("SAPO") molecular sieve. Silicoaluminophosphate molecular sieves are generally classified as being microporous materials having 8-, 10-, or 12-membered ring structures. These ring structures can have an average pore size ranging within the range from 3.5 to 15 angstroms. Preferred are the small-pore SAPO molecular sieves having an average pore size of less than 5 angstroms. These pore sizes are typical of molecular sieves having 8-membered rings.

In certain embodiments, substituted SAPOs can also be used in oxygenate-to-olefin reaction processes. These compounds are generally known as "MAPSOs" or metal-containing silicoaluminophosphates, where "M" is a metal or metal ion. The metal can be alkali metal ions (Group IA), alkaline earth metal ions (Group IIA), rare earth ions (Group IIIB, including the lanthanoid elements) and the additional transition cations of Groups IVB, VB, VIIB, VIIB, VIIIB, and IB. In particular embodiments, "M" is Zn, Mg, Mn, Co, Ni, Ga, Fe, Ti, Zr, Ge, Sn, and Cr. These atoms can be inserted into the tetrahedral framework through a [MO$_2$] tetrahedral unit. The [MO$_2$] tetrahedral unit carries a net electric charge depending on the valence state of the metal substituent.

Suitable silicoaluminophosphate molecular sieves for OTO processes include, but are not limited to, SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, the metal-containing forms thereof, and mixtures thereof. Preferred SAPOs include, but are not limited to, SAPO-18, SAPO-34, SAPO-35, SAPO-44, and SAPO-47, particularly SAPO-18 and SAPO-34, including the metal-containing forms thereof, and mixtures thereof. As used herein, the term "mixture" is synonymous with "combination" and is considered a composition of matter having two or more components in varying proportions, regardless of their physical state.

An aluminophosphate ("ALPO") molecular sieve can also be included in the catalyst composition, alone or in combination with other types of catalysts. Aluminophosphate molecular sieves are crystalline microporous oxides which can have an AlPO$_4$ framework. They can have additional elements within the framework, typically have uniform pore dimensions ranging within the range from 3 angstroms to 10 angstroms, and are capable of making size-selective separations of molecular species. More than two dozen structure types have been reported, including zeolite topological analogues. Preferred ALPO structures include, but are not limited to, ALPO-5, ALPO-11, ALPO-18, ALPO-31, ALPO-34, ALPO-36, ALPO-37, and ALPO-46.

The ALPOs can also include a metal substituent in their frameworks. Preferably, the metal can be selected from the group consisting of magnesium, manganese, zinc, cobalt, and mixtures thereof. These materials preferably exhibit adsorption, ion-exchange and/or catalytic properties similar to aluminosilicate, aluminophosphate, and silicoaluminophosphate molecular sieve compositions. These as-manufactured structures (which contain template prior to calcination) can be represented by empirical chemical composition, on an anhydrous basis, as in (2):

$$mR:(M_xAl_yP_z)O_2 \tag{2}$$

wherein "R" represents at least one organic templating agent present in the intracrystalline pore system; "m" represents the moles of "R" present per mole of $(M_xAl_yP_z)O_2$ and has a value of from zero to 0.3, the maximum value in each case depending upon the molecular dimensions of the templating agent and the available void volume of the pore system of the particular metal aluminophosphate involved; "x", "y", and "z" represent the mole fractions of the metal "M", (e.g., Mg, Mn, Zn, and Co), aluminum, and phosphorus, respectively, present as tetrahedral oxides.

Additional molecular sieve materials, and combinations of materials, can be included as a part of the catalyst composition or they can be used as separate molecular sieve catalysts in admixture with the catalyst if desired. For example, the catalyst useful herein may be an aluminosilicate wherein phosphorous is substantially absent, such as described in US 2003-0176757. Other structural types of small-pore molecular sieves that are suitable for use in the process described herein include AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof. Structural types of medium-pore molecular sieves that are suitable for use in the process described herein include MFI, MEL, MTW, is EUO, MTT, HEU, FER, AFO, AEL, TON, and substituted forms thereof. Specific examples of molecular sieves that can be combined with a silicoaluminophosphate catalyst include ZSM-5, ZSM-34, erionite, and chabazite.

The molecular sieve is typically admixed with other materials. When blended, the resulting composition is typically referred to as a "catalyst composition" which comprises the molecular sieve along with binders or other reactive or inert materials, depending upon its desired use. These materials include kaolin and other clays, various forms of rare earth metals, metal oxides, other non-zeolite catalyst components, zeolite catalyst components, alumina or alumina sol, titania, zirconia, magnesia, thoria, beryllia, quartz, silica, or silica sol, and mixtures thereof. These components are also effective in reducing, inter alia, overall catalyst composition cost, acting as a thermal sink to assist in heat shielding the catalyst during regeneration, densifying the catalyst and increasing catalyst strength. It is particularly desirable that the inert materials that are used in the catalyst composition act as a thermal sink with a heat capacity within the range from 0.05 or 0.1 to 0.8 or 1 cal/g-° C. in certain embodiments.

The catalyst composition, according to an embodiment, comprises within the range from 1 or 5 or 10% to 80 or 99%, by weight of the catalyst composition, of the molecular sieve. The catalyst composition can be subjected to a variety of treatments to achieve the desired physical and chemical characteristics. Such treatments include, but are not necessarily limited to hydrothermal treatment, calcination, acid treatment, base treatment, milling, ball milling, grinding, spray drying, and combinations thereof.

A molecular sieve catalyst particularly useful in making ethylene and propylene is a catalyst which contains a combination of SAPO-34, and SAPO-18 or ALPO-18 molecular sieve. In a particular embodiment, the molecular sieve is a crystalline intergrowth of SAPO-34, and SAPO-18 or ALPO-18.

To convert oxygenate to olefin, any variety of reactor systems can be used, including fixed bed, fluid bed, or moving bed systems. Preferred reactors of one embodiment are co-current riser reactors and short contact time, countercurrent free-fall reactors. The reactor is preferably one in which an oxygenate feedstock can be contacted with a molecular sieve containing catalyst composition at a weight hourly space velocity ("WHSV") of at least 1 $hr^{-1}$, and within the range from 1 or 2 or 5 or 10 or 20 or 30 $hr^{-1}$ to 100 or 200 or 500 or 800 or 1000 $hr^{-1}$ in particular embodiments. WHSV is defined herein as the weight of oxygenate, and reactive hydrocarbon which may optionally be in the feed, per hour per weight of the molecular sieve in the reactor. Because the catalyst composition or the feedstock may contain other materials that act as inerts or diluents, the WHSV is calculated on the weight basis of that oxygenate feed (which can include inerts and/or diluents and/or recycle stream(s)), and any reactive hydrocarbon which may be present with the oxygenate feed, and the molecular sieve contained in the reactor.

Preferably, the oxygenate feed is contacted with the molecular sieve when the oxygenate is in a vapor phase. Alternately, the process may be carried out in a liquid or a mixed vapor/liquid phase. When the process is carried out in a liquid phase or a mixed vapor/liquid phase, different conversions and selectivities of feed-to-product may result depending upon the catalyst composition and reaction conditions.

The process can generally be carried out at a wide range of temperatures. In certain embodiments, the effective operating temperature is within the range from 200 or 300 or 350° C. to 550 or 600 or 700° C.

Operating pressure also may vary over a wide range, including autogenous pressures. Effective pressures include, but are not necessarily limited to, a total pressure of greater than from 1 psia (7 kPaa) or 5 psia (34 kPaa) or 20 psia (138 kPaa) or 25 psia (172 kPaa) or 30 psia (207 kPaa) in certain embodiments. For practical design purposes it is desirable to use methanol as the primary oxygenate feed component and to operate the reactor at a pressure of not greater than 500 psia (3445 kPaa) or 400 psia (2756 kPaa) or 300 psia (2067 kPaa) in certain embodiments.

Undesirable byproducts can be avoided by operating at an appropriate gas superficial velocity. As the gas superficial velocity increases, the conversion decreases, avoiding undesirable byproducts. As used herein, the term, "gas superficial velocity" is defined as the combined volumetric flow rate of vaporized feedstock, which includes diluent when present in the feedstock, as well as conversion products, divided by the cross-sectional area of the reaction zone. Because the oxygenate is converted to a product having significant quantities of ethylene and propylene while flowing through the reaction zone, the gas superficial velocity may vary at different locations within the reaction zone. The degree of variation depends on the total number of moles of gas present, the cross-section of a particular location in the reaction zone, the temperature, the pressure, and other relevant reaction parameters.

In certain embodiments, the gas superficial velocity is maintained at a rate of is greater than from 1 meter per second (m/s) or 2 m/s or 2.5 m/s or 4 m/s or 8 m/s at least one point in the reaction zone, preferably these values apply to substantially all (at least 90% of the reactor volume) the entire reaction zone, and even more preferably all points in the reaction zone.

In certain embodiments, the conversion of the primary oxygenate, for example, methanol, is within the range of from 90 or 92 or 94 wt % to 98 or 98.2 or 99 or 99.8 or 100 wt %. Weight percent conversion is calculated on a water-free basis unless otherwise specified. Weight percent conversion on a water-free basis is calculated as: 100×(weight oxygenate fed on a water-free basis minus the weight of oxygenated hydrocarbon in the product on a water-free basis)/(weight oxygenate fed on a water free basis). The water-free basis of oxygenate is calculated by subtracting out the water portion of the oxygenate in the feed and product and excluding water formed in the product. For example, the weight flow rate of methanol on an oxygenate-free basis is calculated by multiplying the weight flow rate of methanol by 14/32 to remove the water component of the methanol.

The oxygenate-to-olefin process forms a substantial amount of water as a byproduct. Much of this water byproduct is removed prior to separation of the propane and DME from the propylene by cooling the olefin stream from the OTO reactor to a temperature below the condensation temperature of the water vapor in the olefin stream. Preferably, the temperature of the olefin product stream is cooled to a temperature below the condensation temperature of the oxygenate feed. In certain embodiments, it is desirable to cool the product stream below the condensation temperature of methanol.

It is desirable in certain embodiments to cool the olefin stream from the oxygenate-to-olefin reaction process, then separate the cooled olefin stream into a condensed, water-containing stream and an olefin vapor stream. The condensed, water-containing stream comprises most of the water from the olefin stream, and a significant portion of the oxygenated hydrocarbons from the olefin stream. The olefin vapor stream comprises a majority of the olefins, for example, ethylene and propylene.

In one aspect, the olefin stream from the oxygenate-to-olefin reaction process is cooled so that a vapor stream, rich in olefins, can be separated from the condensed water-containing stream. It is desirable that the vapor stream contain not greater than 20 wt % or 15 wt % or 12 wt % water. Preferably, this takes place prior to the olefin stream entering the propylene rectification tower.

A quench tower is one type of equipment that is effective in cooling the olefin is stream from the oxygenate-to-olefin reaction process. In a quench tower, a quenching fluid is directly contacted with the olefin stream to cool the stream to the desired condensation temperature. Condensation produces the condensed water-containing stream, which is also referred to as a heavy bottoms stream. The olefin portion of the olefin product stream remains a vapor and exits the quench tower as an overhead vapor stream. The overhead vapor stream is rich in olefin product and can also contain some oxygenated hydrocarbon byproducts, as well as water.

In one embodiment, the quenching fluid is a recycle stream of the condensed water-containing, heavy bottoms stream of the quench tower. This water-containing stream is desirably cooled, for example, by a heat exchanger, and injected back into the quench tower. It is preferred in this embodiment to not inject cooling medium from an outside source into the quench tower, although it may be desirable to do so in other separation equipment downstream of the quench tower.

Thus, a desired olefin stream is obtained. The olefin stream can contain any number and amount of olefins, and in particular embodiments comprises propane and propylene. In other embodiments the olefin stream also comprises ethylene and ethane.

The Polymerization Process

The intermediate grade propylene stream, and optionally other olefins, is contacted with a polypropylene forming catalyst to form polypropylene. The stream leaving the reactor will include the polypropylene, unreacted propylene, and propane and other diluents if any are used. In one embodiment, the polypropylene forming catalyst comprises one or more Ziegler-Natta catalysts, conventional-type transition metal catalysts, metallocene catalysts, chromium catalysts, or vanadium catalysts, including one or more combinations thereof. Non-limiting examples of Ziegler-Natta catalysts useful in the process described herein include those Ziegler-Natta catalysts described in POLYPROPYLENE HANDBOOK (E. P. Moore, ed., Hanser Publishers, 1996). Metallocenes are described throughout in, for example, 1 & 2 METALLOCENE-BASED POLYOLEFINS (J. Scheirs & W. Kaminsky eds., John Wiley & Sons, Ltd. 2000) and Gregory G. Hlatky, "Heterogeneous Single-Site Catalysts for Olefin Polymerization," 100(4) CHEMICAL REVIEWS 1347-1374 (2000). Other suitable single-site catalysts include, for example, amine-type and/or imino-type coordination catalyst disclosed in, for example, U.S. Pat. No. 6,894,128 and U.S. Pat. No. 7,199,255.

British Patent Application 2,105,355 and U.S. Pat. No. 5,317,036, incorporated herein by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OCH_2CH_2CH_2CH_3)$ and $VO(OCH_2CH_3)_3$; vanadium tetra-halide and vanadium alkoxy halides such as $VCl_4$ and $VCl_3(OH_2CH_2CH_2CH_3)$; vanadium and vanadyl acetyl acetonates and chloroacetyl acetonates such as $V(acetyl\ acetonate)_3$ and $VOCl_2(acetyl\ acetonate)$. Preferred conventional-type vanadium catalyst compounds include $VOCl_3$, $VCl_4$ and $VOCl_2OR$ where "R" is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the polymerization process include $CrO_3$, chromocene, silyl chromate, chromyl chloride ($CrO_2Cl_2$), chromium-2-ethyl-hexanoate, chromium acetylacetonate ($Cr(acetyl\ acetonate)_3$), and the like. Non-limiting examples are disclosed in U.S. Pat. Nos. 3,709,853, 3,709,954, 3,231,550, 3,242,099 and 4,077,904, each of which are incorporated herein by reference.

Any conventional reactor type may be used for the polymerization process. Non-limiting examples include fluid bed reactors, slurry reactors, or linear flow reactors. The use of a fluid bed reactor is described in U.S. Pat. No. 4,482,687, the reactor and catalyst description being incorporated by reference herein. The use of a linear flow loop type reactor is disclosed in U.S. Pat. No. 5,684,097, the reactor and catalyst description being incorporated by reference herein.

In a fluid bed process, solid polymer powder is maintained in a fluidized state by circulating a stream of olefin monomer from the base of a reactor, to the top of the reactor where it is withdrawn, cooled, and then recycled back to the base of the reactor. Solid polymer is removed as it builds up in the reactor. A high rate of reaction gas recycle is typically required to achieve fluidization. The new olefin gas stream is fed to the tower at a rate equal to the withdrawal of polyolefin product and any purge stream.

A loop reactor is a preferred form of a linear flow reactor. In a loop reactor, long straight lengths of piping are connected via short bends forming a loop. Monomer(s), catalyst, and, optionally, solvent are charged into the loop forming a slurry. Polymer formed in the loop is removed from the reactor along with unreacted monomer and diluent or solvent. Multiple loops may be used with portions of the slurry from the first reactor withdrawn and added to a second loop reactor.

Polypropylene product that leaves the polypropylene reactor contains polypropylene as well as various components. Such components include unreacted propylene and propane, as well as incompletely formed polymers and solvents, if solvents are used in the process. The unreacted propylene is preferably recovered and used as a recycle feed to the polymerization process. Other contaminants are removed and discarded as appropriate.

In one embodiment, contaminants are removed from the polypropylene product by way of a purge stream using conventional polymer separation systems. Purging of contaminants, including unreacted propylene and propane, from polypropylene product can be accomplished using any conventional process. Non-limiting examples include flashing, cooling (i.e., condensation), distillation, absorption or combinations of these, depending on whether the effluent from the polymerization reactor is in the liquid phase or the gas phase, and on what other components are present. Physical phase separation of powder or particle streams from gas streams, or of liquid streams from gas streams, can be carried out, for example, using gravity separators or cyclone separators.

From the purge stream propylene is recovered and sent as recycle feed to the polymerization process. In general, propane and propylene will be recovered by way of the purge stream and, preferably, a substantial portion of the propane is separated from the unreacted propylene to reduce the amount of propane that is recycled to the reaction process. Such separation of propane from the purge stream can be accomplished by conventional means, including distillation or separation using molecular sieves or membranes. In certain embodiments, at least a portion of the unreacted propylene, and propane from the polypropylene reactor is circulated back to the olefin stream, preferably all of the unreacted propylene and propane is circulated back in another embodiment.

Thus made, polypropylene is isolated from the polymerization reactor in the form of a homopolymer, random copolymer (when ethylene or additional monomers are added to the reactor), block copolymer, impact copolymer and other propylene-based polymers and elastomers (having at least 50 wt % propylene-derived units by weight of the total polymer).

Figure 2:
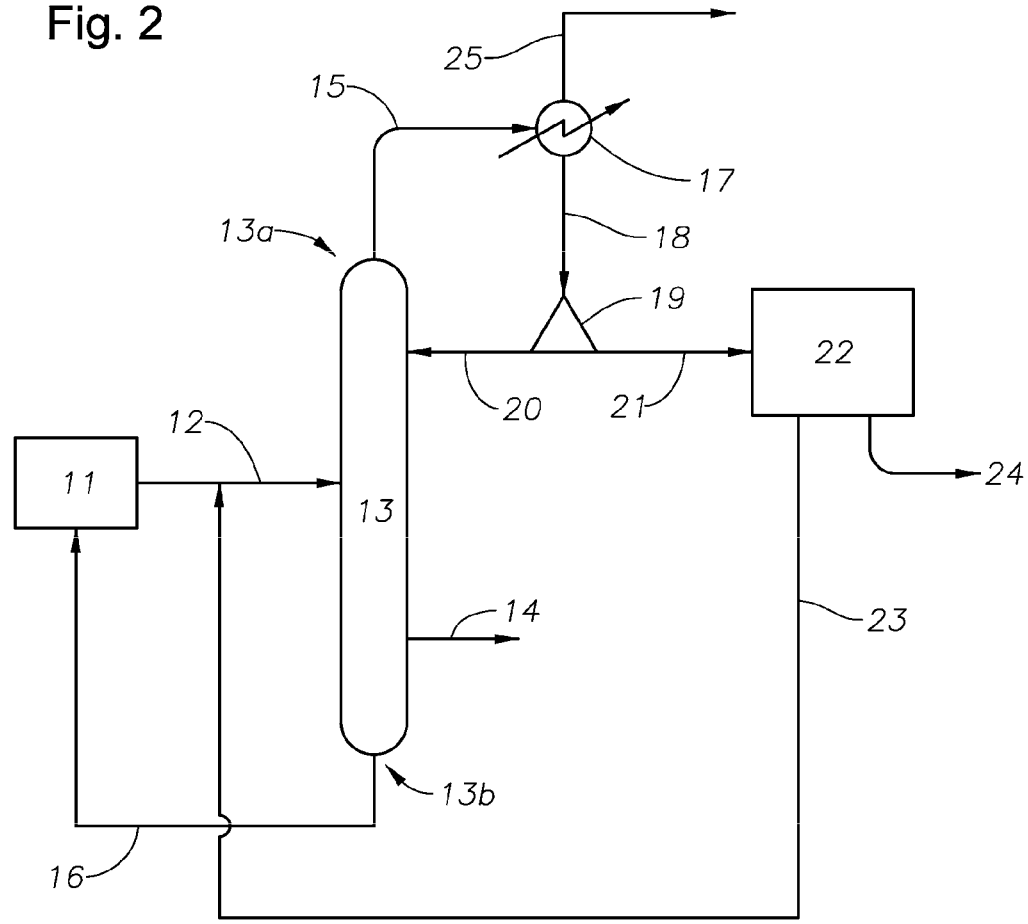
FIG. 2 is a more detailed flow diagram of the apparatus useful in producing a desirable propylene feed for producing polypropylene, the apparatus including a propylene rectification tower and polypropylene polymerization reactor.

An embodiment of the apparatus useful in making polypropylene may be described with reference to FIG. 2, wherein an OTO (or MTO) reactor 11 is provided in fluid connection to one propylene rectification tower 13 having a top portion 13a and a bottom portion 13b. The rectification tower may have any conventional design known in the art, or other designs that possess the desired $N_t$. Optionally, between OTO reactor 11 and rectification tower 13 is located a deethanizer which removes at least a portion of the C2 is hydrocarbons to deliver a second stream of olefins in line 12 to the tower 13. Since C4 and higher hydrocarbons may be present in the olefin stream from the OTO reaction, a means to remove these hydrocarbons is provided in certain embodiments. In a particular embodiment, a means to remove C4 and higher hydrocarbons is provided for the olefin stream prior to entering the rectification tower. In another particular embodiment, a means to remove C4 and higher hydrocarbons is provided for the dimethylether stream prior to recirculating to the OTO reactor 11.

In any case, rectification tower 13 is in fluid connection to a condenser 17, preferably the fluid connection derives from the top portion 13a of the tower. Condenser 17 is then in fluid connection to a splitter 19, wherein fluid connections are made back to the rectification tower 13 and the polymerization reactor 22. A line 23 is provided for recycle of unreacted propylene and/or propane back to the olefin stream 12. In other embodiments, the feeds of lines 23 and 12 will enter the rectification tower separately and not mixed prior to entering the tower.

An embodiment of the process used to produce the polypropylene, as outlined in FIG. 1, can also be described with reference to FIG. 2. Here, an oxygenate stream is contacted with a molecular sieve containing catalyst composition in an OTO (or MTO) reactor 11 under OTO-type reactor conditions known in the art to form an olefin stream carried in line 12 comprising at least ethane, ethylene, propane, propylene and DME. This olefin stream 12 that contains DME is introduced into a propylene rectification tower 13 at any desirable location, preferably towards the tower bottom 13b, most preferably within 50 or 40 or 30 theoretical stages from the bottom 13b. From the rectification tower bottoms is withdrawn a DME stream 16 which can be recycled back to OTO reactor 11. A means of removing C4 and higher hydrocarbons may also be provided in certain embodiments, as stream 16 may comprise such. In one embodiment, the stream in line 16 passes through a depropanizer, which will eliminate C4 and higher hydrocarbons. In another embodiment, the olefin stream in line 12 is first passed through a deethanizer before entering tower 13.

From the propylene rectification tower 13 a propane side stream from line 14 is withdrawn, and from the tower overhead a gas stream 15 comprising at least propane, propylene, and optionally ethane and ethylene and other light components. The propane side stream can be removed from any desirable location along the tower as described herein, in one embodiment through a draw tray located at the desired location. The overhead gas stream 15 is directed to condenser 17 to accumulate a propylene-rich stream, while optionally allowing for ethane, ethylene and any other light gases to be withdrawn through an ethylene-rich stream 25. The propylene-rich stream 18 is passed to a splitter 19 of any conventional design to produce a first propylene stream 21 that is introduced into a polypropylene reactor 22 to contact a polyolefin catalyst, and a second propylene stream 20 that is re-introduced into the rectification overhead. The first and second propylene streams are introduced at a ratio within the range from 1:2 to 1:30, or any desirable range there between. Furthermore, the second propylene stream 20 may be introduced at any desirable location in tower 13 as described herein.

In reactor 22 comprises olefin polymerization catalyst and any other desirable polymerization components such as, for example, hydrogen, cocatalyst, and other components well known in the art. The catalyst is contacted with propylene entering the reactor to produce the polypropylene. Unreacted hydrogen, ethane, propylene and propane ("purge stream") from the polymerization reactor 22 can be directed, for example, through line 23, to a demethanizer and/or a deethanizer in certain embodiments. Any propane and/or propylene recovered can be sent back to the olefin stream 12 or tower 13 through the remainder of line 23. In another embodiment, the unreacted material from polymerization reactor 22 is vented directly through line 23 to line 12 or tower 13. Finally, polypropylene 24 is isolated from the polypropylene reactor 22 in the form of, for example, granules, a slurry, or a solution.

In a particular embodiment, the ethane and ethylene-rich stream 25 is refined further in a demethanizer and/or a deethanizer. Any propane and/or propylene recovered can be sent back to the propylene rectification tower or the condenser. In yet another embodiment, the purge stream in line 23 is directed to a demethanizer and/or a deethanizer. Any propane and/or propylene recovered can be sent back to the propylene rectification tower 13.

Having described the process and the apparatus and its various features, described herein in numbered embodiments is:

1. A method of producing polypropylene comprising (or consisting essentially of):
    (a) contacting an oxygenate stream with a molecular sieve to form an olefin stream comprising propane, propylene and dimethylether;
    (b) introducing the olefin stream into a propylene rectification tower possessing from less than 200 theoretical stages;
    (c) withdrawing from the propylene rectification tower a bottom stream comprising dimethylether, a sidestream comprising propane, and an overhead stream comprising propane and propylene;
    (d) introducing the overhead to a condenser to accumulate a propylene-rich stream;
    (e) passing the propylene-rich stream to a splitter to produce (i) a first propylene stream that is introduced into a polypropylene reactor to contact a polyolefin catalyst, and (ii) a second propylene stream that is re-introduced into the rectification tower, the first and second propylene streams introduced at a ratio within the range from 1:2 to 1:30; and (f) recirculating the dimethylether stream to contact the molecular sieve.

2. The method of numbered embodiment 1, wherein the olefin stream and overhead stream also comprises ethylene and ethane; and further comprising separating an ethane and ethylene-rich stream from the condenser.

3. The method of numbered embodiments 1 and 2, further comprising introducing the olefin stream into a deethanizer to produce a second olefin stream which is then introduced into the propylene rectification tower.

4. The method of any one of the previously numbered embodiments, wherein the propylene rectification tower is operated at conditions to provide a first propylene stream comprising from less than 200 wppm dimethylether.

5. The method of any one of the previously numbered embodiments, wherein the propylene rectification tower is operated at conditions to provide a first propylene stream comprising from 1 to 10 wt % propane, by weight of the first propylene stream.

6. The method of any one of the previously numbered embodiments, wherein the molecular sieve is selected from aluminosilicates or silicoaluminophosphates.

7. The method of any one of the previously numbered embodiments, wherein the pressure within the propylene rectification tower is within the range from 50 to 1000 psig.

8. The method of any one of the previously numbered embodiments, wherein the olefin stream has not been hydrotreated.

9. The method of any one of the previously numbered embodiments, wherein the sidestream is withdrawn from a position along the tower located at from 1 to 40 theoretical stages from the bottom of the propylene rectification tower.

10. The method of any one of the previously numbered embodiments, wherein at least a portion of the unreacted hydrogen, ethane, propylene and propane from the polymerization reactor is directed to a separation means; and wherein any propane and/or propylene recovered is directed to the olefin stream or propylene rectification tower.

11. The method of any one of the previously numbered embodiments, wherein a means to remove C4 and higher hydrocarbons is provided for the olefin stream prior to entering the rectification tower.

12. The method of any one of the previously numbered embodiments, wherein a means to remove C4 and higher hydrocarbons is provided for the dimethylether stream prior to recirculating to contact the molecular sieve.

13. The method of any one of the previously numbered embodiments, wherein the process further comprises isolating polypropylene from the polypropylene reactor.

By "consisting essentially of" in embodiment 1, what is meant is that no other rectification or condensation steps take place with respect to the propylene throughout the claimed process (from OTO reactor to polymerization reactor). There may be ancillary steps that take place with respect to ethylene, DME, and other components, and also additional minor components and steps such as compressors, vents, coolers, heaters, etc.

Also described is the use of an apparatus to produce polypropylene comprising (or, alternately, consisting essentially of) an OTO (or MTO) reactor in fluid connection to one propylene rectification tower having a top portion and a bottom portion, and possessing from less than 200 theoretical stages to allow oxygenates such as DME to be separated from propylene and propane in an olefin stream in contact with the rectification tower, the rectification tower further being in fluid connection to a condenser, preferably the fluid connection derives from the top portion of the tower, the condenser being in fluid connection to a splitter, wherein fluid connections are made back to the rectification tower and a polymerization reactor, wherein a fluid connection is provided for recycle of unreacted propylene and/or propane back to the olefin stream or the rectification tower, and wherein, alternatively, a means to remove C4 and higher hydrocarbons is provided for the olefin stream prior to entering the rectification tower, or alternatively, a means to remove C4 and higher hydrocarbons is provided for the dimethylether stream prior to recirculating to the OTO reactor.

What is claimed is:

1. A method of producing polypropylene comprising:
   (a) contacting an oxygenate stream with a molecular sieve to form an olefin stream comprising propane, propylene and dimethylether;
   (b) introducing the olefin stream into a propylene rectification tower possessing from less than 200 theoretical stages;
   (c) withdrawing from the propylene rectification tower a bottom stream comprising dimethylether, a sidestream comprising propane, and an overhead stream comprising propane and propylene;
   (d) introducing the overhead to a condenser to accumulate a propylene-rich stream;
   (e) passing the propylene-rich stream to a splitter to produce (i) a first propylene stream that is introduced into a polypropylene reactor to contact a polyolefin catalyst, and (ii) a second propylene stream that is re-introduced into the rectification tower, the first and second propylene streams introduced at a ratio within the range from 1:2 to 1:30; and
   (f) recirculating the dimethylether stream to contact the molecular sieve.

2. The method of claim 1, wherein the olefin stream and overhead stream also comprises ethylene and ethane; and further comprising separating an ethane and ethylene-rich stream from the condenser.

3. The method of claim 1, further comprising introducing the olefin stream into a deethanizer to produce a second olefin stream which is then introduced into the propylene rectification tower.

4. The method of claim 1, wherein the propylene rectification tower is operated at conditions to provide a first propylene stream comprising from less than 200 wppm dimethylether.

5. The method of claim 1, wherein the propylene rectification tower is operated at conditions to provide a first propylene stream comprising within the range from 1 to 10 wt % propane, by weight of the first propylene stream.

6. The method of claim 1, wherein the molecular sieve is selected from aluminosilicates or silicoaluminophosphates.

7. The method of claim 1, wherein the pressure within the propylene rectification tower is within the range from 50 to 1000 psig.

8. The method of claim 1, wherein the olefin stream has not been hydrotreated.

9. The method of claim 1, wherein the sidestream is withdrawn within the range from 1 to 40 theoretical stages from the bottom of the propylene rectification tower.

10. The method of claim 1, wherein at least a portion of the unreacted hydrogen, ethane, propylene and propane from the polymerization reactor is directed to at least one separation means; and wherein any propane and/or propylene recovered is directed to the olefin stream or propylene rectification tower.

11. The method of claim 1, wherein a means to remove C4 and higher hydrocarbons is provided for the olefin stream prior to entering the rectification tower.

12. The method of claim 1, wherein a means to remove C4 and higher hydrocarbons is provided for the dimethylether stream prior to recirculating to contact the molecular sieve.

13. The method of claim 1, wherein the propylene rectification tower possessing from less than 165 theoretical stages.

14. The method of claim 1, wherein the propylene rectification tower possessing within the range from 20 to 200 theoretical stages.

15. The method of claim 1, wherein the process further comprises isolating polypropylene from the polypropylene reactor.

* * * * *